United States Patent
Cobb

(10) Patent No.: US 6,394,159 B1
(45) Date of Patent: May 28, 2002

(54) HUB CAP FILTER FOR TIRE INFLATION SYSTEM

(75) Inventor: Bruce V. Cobb, Livonia, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/770,785

(22) Filed: Jan. 26, 2001

(51) Int. Cl.[7] .............................................. B60B 23/10
(52) U.S. Cl. ...................................................... 152/416
(58) Field of Search ................. 152/417, 415, 152/416

(56) References Cited

U.S. PATENT DOCUMENTS

| | | |
|---|---|---|
| 4,498,709 A | 2/1985 | Wells et al. |
| 4,733,707 A | 3/1988 | Goodell et al. |
| 4,883,106 A | 11/1989 | Schultz et al. |
| 4,932,451 A | 6/1990 | Williams et al. |
| 5,203,391 A | 4/1993 | Fox |
| 5,287,906 A | 2/1994 | Stech |
| 5,377,736 A | 1/1995 | Stech |
| 5,429,167 A | 7/1995 | Jensen |
| 5,538,062 A | 7/1996 | Stech |
| 5,584,949 A | 12/1996 | Ingram |
| 5,587,698 A * | 12/1996 | Genna .......................... 152/417 |
| 5,769,979 A | 6/1998 | Naedler |
| 5,979,526 A * | 11/1999 | Chamoy ....................... 152/417 |
| 6,105,645 A * | 8/2000 | Ingram ......................... 152/415 |
| 6,145,559 A * | 11/2000 | Ingram, II ................... 152/417 |
| 6,260,595 B1 * | 7/2001 | Cobb ............................ 152/417 |

FOREIGN PATENT DOCUMENTS

| | | |
|---|---|---|
| DE | 2612332 | 3/1976 |
| DE | 3619603 | 6/1986 |
| GB | 492510 | 9/1938 |
| GB | 2178705 | 8/1985 |
| WO | 9216384 | 10/1992 |

* cited by examiner

*Primary Examiner*—S. Joseph Morano
*Assistant Examiner*—Long Bao Nguyen
(74) *Attorney, Agent, or Firm*—Carlson, Gaskey & Olds

(57) ABSTRACT

A vehicle tire inflation system includes an axle assembly with an axle housing having an air supply conduit. Air is provided to the air supply conduit from an air tank mounted on the vehicle. The axle includes least one wheel hub rotatably supported on the axle housing by bearings. A hub cap is mounted at one end of the wheel hub and has an air passageway for conducting an air supply through the hub cap to a tire. A filter is installed within the passageway to remove any debris from the air supply.

14 Claims, 1 Drawing Sheet

HUB CAP FILTER FOR TIRE INFLATION SYSTEM

BACKGROUND OF THE INVENTION

This application relates to a unique hub cap used in wheel end assembly for a tire inflation system. The hub cap includes an internal filtering system for removing contaminants from the air supply before entering the tires.

Tire inflation systems automatically supply air to tires when certain predetermined conditions are met. In a typical situation, the tire inflation system will automatically add air to a tire that becomes under-inflated during vehicle operation. Tire inflation systems include sensors and pressure regulators for monitoring the pressure in each of the vehicle's tires. When pressure in any tire drops below a predetermined level, the system automatically supplies air to that tire until a desired pressure is achieved.

Some systems include check valves for permitting one way air flow, i.e., air flow from the air supply to the tire, so that unwanted tire deflation does not occur. Other systems include valves for permitting two way air flow, i.e. air flow into and out of the tires, so that variable tire pressures can be achieved depending upon the type of terrain over which the vehicle will travel. For example, on hard surfaces such as packed dirt or concrete a higher tire pressure is preferred whereas on surfaces such as sand or mud a lower tire pressure is preferred for increased traction. Usually the tire inflation systems also include an unloader valve that prevents air from being supplied to a tire if there is a blowout.

The tire inflation systems include an air tank that is mounted on the vehicle. Air is supplied from the tank to the tires by using various methods. All inflation systems must include a rotary connection that allows air to be supplied to the tires during rotation. Some systems include a rotary valve mounted on one end of the axle. In theses systems, air is supplied from the tank to the interior of the axle. Air from inside the axle passes through the rotary valve and is conducted to the tires. Another system supplies air via a hub that is rotatable supported on the axle. Rotary seals are used to provide a sealed environment for air conduction.

When vehicles operate off-road under severe conditions, the air supply can become easily contaminated with dirt particles and other debris, which can clog air supply system components. Air filtering systems are required to remove any contaminants from the air before entering the tires. Current air filters are located with the axle housing. This location is undesirable because it is difficult to replace and/or remove the filters.

Thus, it is desirable to have a wheel end assembly for a tire inflation system that provides a simplified air filtering system that can be easily installed and which utilizes an air filter that is easily accessible for removal, replacement, or cleaning.

SUMMARY OF THE INVENTION

A wheel end assembly for a vehicle tire inflation system includes a wheel hub that is rotatably supported on an axle member and a hub cap mounted for rotation with the wheel hub. The axle includes an air supply conduit for conducting an air supply to a passageway formed within the hub cap. The passageway has an inlet in communication with the air supply conduit and an outlet in communication with at least one pneumatic tire. A filter is mounted within the passageway between the inlet and the outlet to remove debris from the air supply. The purified air is supplied to the tire via a tire inlet.

In the preferred embodiment, the hub cap has an inner wall, an outer wall and a flange positioned between the inner and outer walls. The filter is mounted within the hub cap between the inner wall and the flange. The flange preferably has a smaller diameter than the outer wall to create a peripheral gap about the inner circumference of the hub cap. The peripheral gap forms a portion of the passageway between the inlet and the outlet.

In a further preferred embodiment, the hub cap includes a circumferential lip that is in abutting contact with an outer face of the wheel hub at a first axial location. The hub cap defines an inner space between an end of the axle member and the hub cap at a second axial location. Finally, the air supply conduit extends into a seal in the end of the axle member at a third axial location where the third axial location is intermediate the first and second axial locations. The filter is mounted within the inner space at the second axial location such that the hub cap provides air purification at a location axially outward from the wheel hub.

By providing a hub cap with an internal air filter for removing debris from the air supply before entering the tires, the subject invention presents a simplified filtering system that is easy to install. Moreover, the use of an air filter within the hub cap provides easy access for removal, repair, and cleaning.

DETAILED DESCRIPTION OF THE PREFERRED EMBODIMENT

Figure 1:
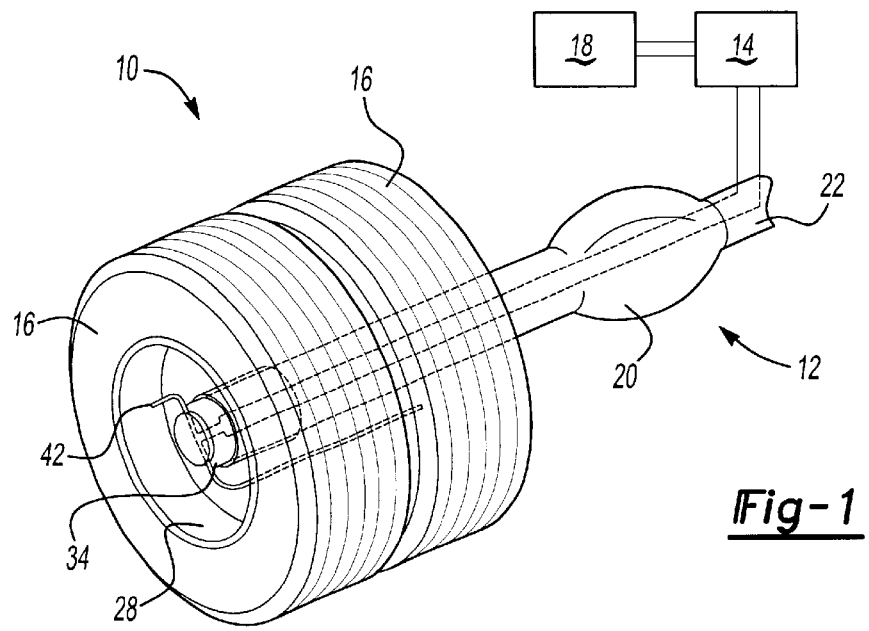
FIG. 1 is a perspective view, partially cut-away, of a wheel end assembly incorporating the inventive hub cap.

As shown in FIG. 1, a wheel end assembly 10 is mounted to an axle 12. A tire inflation system, shown schematically at 14, is installed in a vehicle and supplies air to tires 16 when certain pre-determined conditions are met. For example, if a tire pressure falls below a certain level, the tire inflation system 14 can automatically supply air from an air tank 18 to the tire 16 until the desired tire pressure is achieved. The tire inflation system 14 can be any of various systems known in the art.

The wheel end assembly 10 is mounted on one end of the axle 12. It should be understood that the axle 12 has a second wheel end assembly mounted on the opposite end of the axle 12, however, only one wheel end assembly 10 is shown for description purposes. In the preferred embodiment, the axle 12 includes a housing 20 which can have an internal conduit 22 that routes air from the inflation system 14 through the axle housing 20.

Figure 2:
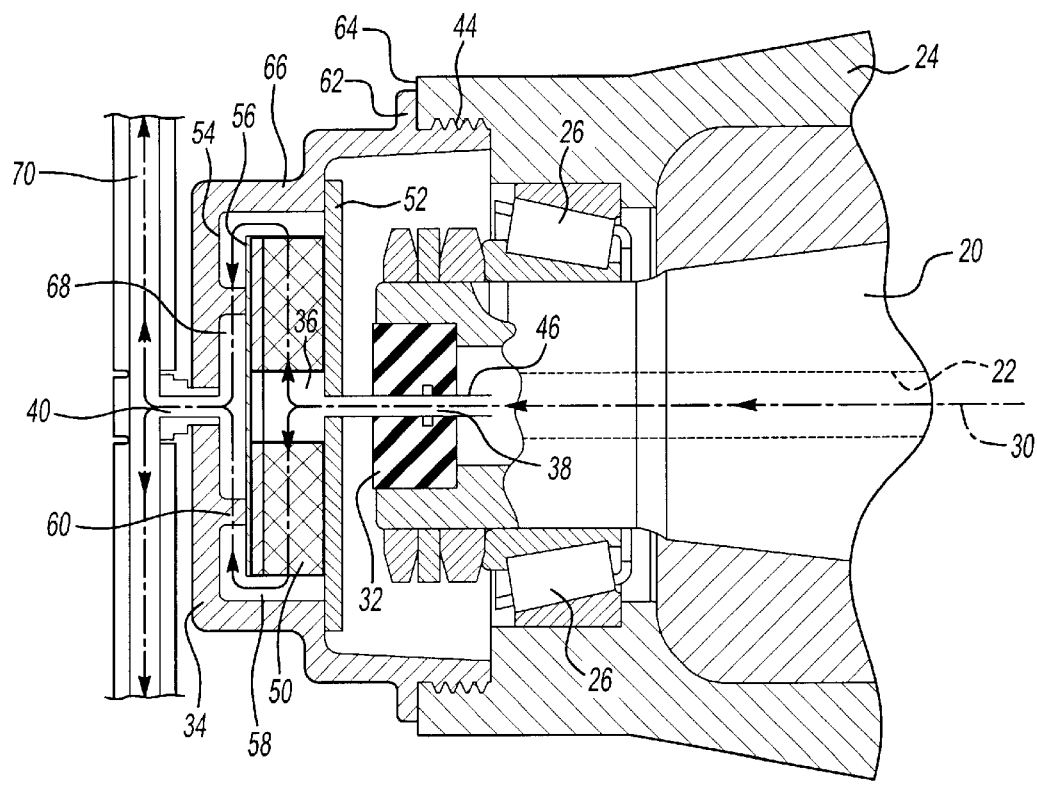
FIG. 2 is a cross-sectional view of a wheel end assembly incorporating the hub cap.

A wheel hub 24 is rotatably mounted on an end of the axle 12 with bearings 26, shown in FIG. 2. Rims 28 are mounted to the hub 24 and the tires 16 are mounted on the rims 28. The hub 24 defines an axis of rotation 30 about which the tires 16 rotate. As shown in FIG. 1, the axle 12 has two (2) tires 16 mounted at one end. It should be understood that the subject invention could also be used on an axle configuration where only one tire 16 was mounted on a rigid axle end or steerable axle end.

A rotary plug or seal 32 is inserted into one end of the axle 12 to seal an end of the air supply conduit 22. A hub cap 34 is installed on the wheel hub 24 and includes a passageway extending through the body of the hub cap 34. The inflation system 14 supplies air through the air supply conduit 22 through the passageway 36 in the hub cap 34 to the vehicle tires 16.

The passageway 36 includes an inlet 38 that communicates with the air supply conduit 22 and an outlet 40 that communicates with a tire valve 42. The hub cap 34 may be circular in shape and the passageway 36 extends through the hub cap 34.

The wheel end assembly 10 includes the wheel hub 24 that is rotatably supported on the axle 12 with the air supply conduit 22. The hub cap 34 is mounted for rotation with the wheel hub 24 via a threaded connection 44 or by fasteners (not shown).

In the preferred embodiment a tube 46 is inserted partially into the inlet 38 of the passageway 36. One end of the tube 46 is inserted into the hub cap 34 and the opposite end of the tube 46 is inserted into the seal 32. The tube 46 spins on an O-ring (not shown) mounted in the seal 32. The tube 46 can be press-fit or glued into the hub cap 34, or other methods known in the art could be used to attach the tube 46 and hub cap 34.

A filter 50 is mounted within the passageway 36 between the inlet 38 and the outlet 40 for removing debris from the air supply. Any type of filter or filtering material known in the art can be installed within the passageway 36 to remove the debris. In the preferred embodiment, the hub cap 34 includes an inner wall 52, an outer wall 54 and a flange 56 positioned between the inner 52 and outer 54 walls. The filter 50 is securely mounted within the hub cap 34 between the inner wall 52 and the flange 56.

In this instance, the flange 56 has a smaller diameter than the outer wall 54 creating a peripheral gap 58 about the inner circumference of the hub cap 34. The peripheral gap 58 forms a portion of the passageway 36 between the inlet 38 and the outlet 40. The inlet 38 is centrally located within the inner wall 52 and the outlet 40 is centrally located within the outer wall 54 such that the air supply flows from the inlet 38, through the filter 50 to the peripheral gap 58, and then to the outlet 40. A mounting portion 60 extends from the outer wall 54 to the flange 56 to properly position the flange 56 to allow adequate air flow through the passageway 36. The flange 56 can be integrally formed with the hub cap 34 as one piece, or can be formed as part of the filter 50 and mounted to the mounting portion 60.

The positioning of the filter 50 within the hub cap 34 allows for easy access to the filter 50 for regular maintenance including cleaning, repair, or replacement. Filter is installed axially outward from the axle end to accomplish this goal. The hub cap has a circumferential lip 62 that abuts against an outer face 64 of the wheel hub 24 at a first position along the axis 30. A side wall 66 extends from the outer wall 54 to the circumferential lip 62 to form an enclosed inner space 68 between the inner 52 and outer 54 walls. This inner space 68 between an end of the axle member 12 and the hub cap 34 is located at a second position along the axis 30. The air supply conduit 22 extends into the seal 32 in the end of the axle housing 20 at a third position along the axis 30 where the third position is intermediate the first and second positions. The filter 50 is mounted within the inner space 68 at the second position such that the hub cap 34 provides air purification at a location axially outward from the wheel hub 24. The purified air flows through the outlet 40 into a conduit 70 that leads to the tire valve 42.

The hub cap 34 is preferably cast as a single piece from steel, however, other known manufacturing methods could be used. While steel is the preferred material, it should be understood that the hub cap 34 could be formed from aluminum, plastic, fiberglass, or other materials.

The subject invention provides a simplified filtering system that utilizes a hub cap 34 with an internal air filter 50 for removing debris from the air supply before entering the tires 16. Moreover, the use of an air filter 50 within the hub cap 34 provides easy access for removal, repair, and cleaning.

Preferred embodiments of this invention have been disclosed, however, a worker of ordinary skill in the art would recognize that certain modifications would come within the scope of this invention. For that reason the following claims should be studied to determine the true scope and content of this invention.

I claim:

1. A wheel end assembly for a vehicle tire inflation system comprising:
    a wheel hub rotatably supported on an axle member having an air supply conduit;
    a hub cap mounted for rotation with said wheel hub and having a passageway for conducting an air supply through said hub cap, said passageway having an inlet in communication with said air supply conduit and an outlet;
    a filter mounted within said passageway between said inlet and said outlet for removing debris from the air supply; and
    at least one pneumatic tire mounted for rotation with said wheel hub and having a tire inlet for receiving an air supply from said outlet of said hub cap.

2. An assembly as set forth in claim 1 wherein said hub cap includes an inner wall, an outer wall and a flange positioned between said inner and outer walls, said filter being mounted within said hub cap between said inner wall and said flange.

3. An assembly as set forth in claim 2 wherein said flange has a smaller diameter than said outer wall creating a peripheral gap about the inner circumference of said hub cap and wherein said peripheral gap forms a portion of said passageway between said inlet and said outlet.

4. An assembly as set forth in claim 3 wherein said inlet is centrally located within said inner wall and said outlet is centrally located within said outer wall such that the air supply flows from said inlet, through said filter to said peripheral gap, and then to said outlet.

5. An assembly as set forth in claim 1 wherein said hub cap has a circumferential lip in abutting contact with an outer face of said wheel hub at a first axial location, said hub cap defines an inner space between an end of the axle member and the hub cap at a second axial location, and said air supply conduit extends into a seal in the end of the axle member at a third axial location, said third axial location being intermediate said first and second axial locations.

6. An assembly as set forth in claim 5 wherein said filter is mounted within said inner space at said second axial location such that said hub cap provides air purification at a location axially outward from said wheel hub.

7. A vehicle axle assembly for use with a tire inflation system comprising:
    an axle housing having an air supply conduit;
    at least one wheel hub rotatably supported on said axle housing by bearings;
    a hub cap mounted at one end of said wheel hub and having an inner wall with an air inlet in communication with said air supply conduit, an outer wall with an air outlet, and a flange positioned between said inner and outer walls;
    a filter mounted between said inner wall and said flange for removing debris from the air supply before exiting from said outlet; and
    at least one pneumatic tire mounted for rotation with said wheel hub for receiving a purified air supply from said outlet.

8. An assembly as set forth in claim 7 including a rotary seal member mounted within an end of said axle housing.

9. An assembly as set forth in claim 8 wherein said hub cap has a circumferential lip in abutting contact with an outer face of said wheel hub at a first axial location, said hub cap defines an inner space between said axle housing and said outer wall of said hub cap at a second axial location, and said air supply conduit extends into said seal at a third axial location, said third axial location being intermediate said first and second axial locations.

10. An assembly as set forth in claim 9 wherein said filter is mounted within said inner space at said second axial location such that said hub cap provides air purification at a location axially outward from said wheel hub.

11. A hub cap for a wheel end in a tire inflation system comprising:

a main body having an inner wall, an outer wall, and a flange mounted between said inner and outer walls;

a circumferential lip having a mounting portion for attaching the hub cap to a wheel end component;

a side wall extending from said outer wall to said circumferential lip to form an enclosed inner space between said inner and outer walls;

an air passage having in inlet formed within said inner wall and an outlet formed within said outer wall for conducting an air supply through said body; and a filter mounted between said inner wall and said flange for removing debris from the air supply before exiting from said outlet.

12. A hub cap as set forth in claim 11 wherein said flange has a smaller diameter than said inner and outer walls to form a peripheral gap within said inner space.

13. A hub cap as set forth in claim 12 wherein said inlet is centrally located within said inner wall and said outlet is centrally located within said outer wall such that the air supply flows from said inlet, through said filter to said peripheral gap, and then to said outlet.

14. A hub cap as set forth in claim 13 wherein said mounting portion attaches to the wheel end component at a first axial location, said filter is positioned within said inner space at a second axial location, and said inner wall is positioned at a third axial location being intermediate said first and second axial locations.

* * * * *